United States Patent

Braun et al.

[11] 4,231,600
[45] Nov. 4, 1980

[54] AUTOMOBILE BUMPER

[75] Inventors: Walter Braun, Sindelfingen; Hermann Burst, Rutesheim; Dietmar Peter, Stuttgart-Feuerbach, all of Fed. Rep. of Germany

[73] Assignee: Dr. Ing. h.c.F. Porsche Aktiengesellschaft, Fed. Rep. of Germany

[21] Appl. No.: 952,046

[22] Filed: Oct. 17, 1978

[30] Foreign Application Priority Data

Oct. 21, 1977 [DE] Fed. Rep. of Germany ....... 2747224

[51] Int. Cl.³ ............................................. B60R 19/08
[52] U.S. Cl. ................................. 293/128; 293/155
[58] Field of Search .................. 293/121, 155, 128

[56] References Cited

U.S. PATENT DOCUMENTS

| 2,893,776 | 7/1959 | Earl | 293/121 |
|---|---|---|---|
| 3,938,841 | 2/1976 | Glance | 293/120 |
| 4,109,951 | 8/1978 | Weller | 293/155 |

Primary Examiner—John J. Love
Assistant Examiner—John A. Carroll
Attorney, Agent, or Firm—Craig & Antonelli

[57] ABSTRACT

An automobile bumper having a support that is rigid in its configuration and a covering of elastic material is fixed to the car body via a flangelike portion by fastening means but can be bolted. Visible depressions, indentations or the like in the covering are avoided in a preferred embodiment by a strip having a widened portion that penetrates into the flangelike covering and which has sleeves which extend through the covering so as to bear upon the vehicle body in the region of the fastening members.

8 Claims, 3 Drawing Figures

AUTOMOBILE BUMPER

BACKGROUND AND SUMMARY OF THE INVENTION

The invention relates to an automobile bumper, comprising a support that is rigid in its configuration and a covering of elastic material, fixed to the car body via a flangelike portion, with fastening by means of fastening members that can be bolted.

In a known bumper of the described species (*Automobiltechnische Zeitschrift* 76 (1974) No. 11 P. 375) flangelike portions of the covering are arranged on downwash angles on the body. Insofar as the flangelike portion is bolted to the angles, because of the elastic properties of the covering and the specific load of the bolts, depressions, dents and the like are formed on the visible surface of the covering, which are seen with particular distinctness because of the gloss of the enamel, and hence they are a flaw. This phenomenon can be brought out even more by thermal dilation of the elastic covering.

An object of the invention is, therefore, to take such measures, relating to the covering, that visible depressions, indentations or the like will be avoided.

The problem is solved according to a preferred embodiment of the invention in that the flangelike portion of the covering is provided, at least over a partial extent, with a strip that is rigid in its configuration, said strip having at least one widened part that penetrates into the flangelike portion, with sleeves that bear on the car body in the region of the fastening members. For this it is an advantage if the strip is provided on the side of the flangelike porion which is turned away from the car body. The strip is angular in cross section and the sleeves are joined so as to be integral with the strip. It is advantageous if the strip is made of steel. The strip is constituted by a part that is separate from the covering. There is the possibility however that the strip may be undetachably joined with the covering.

Advantages deriving especially from the invention can be seen in that a strip with a widened portion that penetrates into the flangelike portion and the sleeves ensure the stability of the configuration of the covering, i.e. the flangelike portion of the covering is held firmly in place by the strip, on the fastening members. By this arrangement, even with thermal dilation and after deformation of the covering there will be no visible dents, indentations or the like on it. The sleeves further ensure that there will be no pressure spots on the covering that would cause superficial unevenness.

These and further objects, features and advantages of the present invention will become more obvious from the following description when taken in connection with the accompanying drawings which show, for purposes of illustration only, a single embodiment in accordance with the present invention.

DETAILED DESCRIPTION OF THE PREFERRED EMBODIMENT

Figure 1:
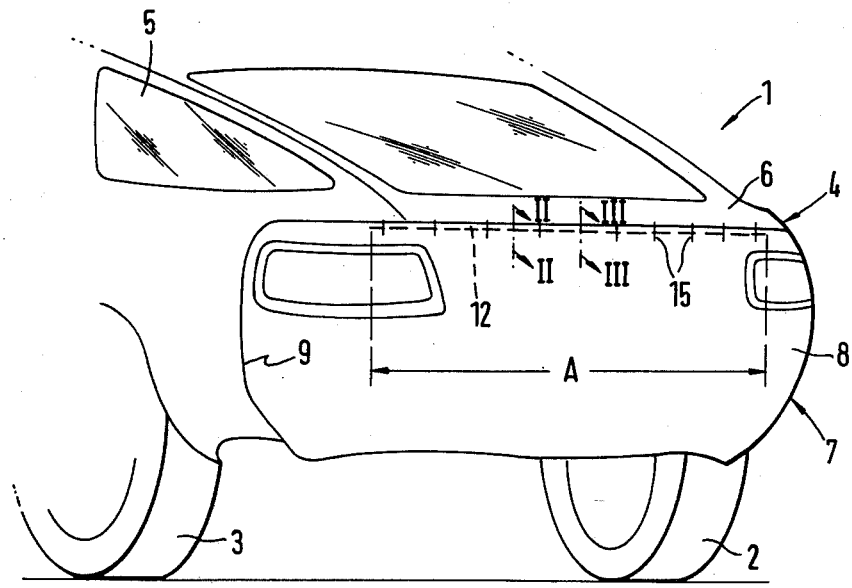
FIG. 1 is an oblique view of the rear of an automobile with the bumper of the invention.
Figures 2, 3:
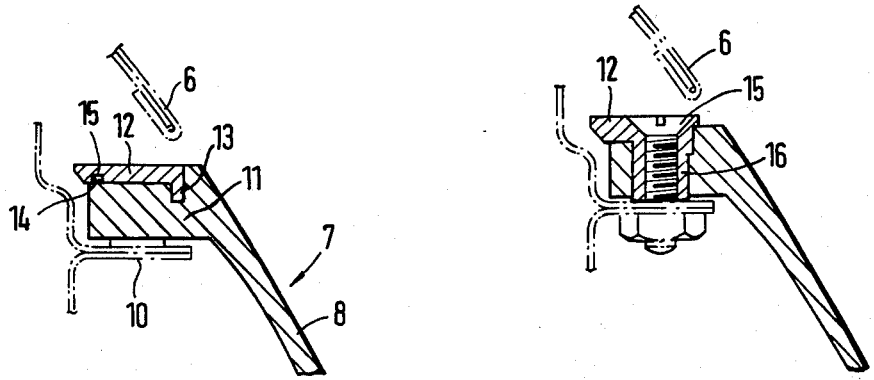
FIG. 2 is a section along line II—II of FIG. 1, on a larger scale.
FIG. 3 is a section along line III—III of FIG. 1, on a larger scale.

Automobile 1 has wheels 2, 3 in the illustrated area, and body 4 with side panels 5 and a trunk lid 6. Body 4 has a bumper 7 that is constituted by a covering 8 and a rigid support behind it which is not shown in detail. The said support supports covering 8 and bears on hydraulic dampers which likewise are not illustrated. Covering 8 consists of an elastic material, e.g. polyurethane, which yields on impact for example at twice the travelling speed of the car, and automatically resumes its original configuration.

The fastening of cover 8 is along a line of separation 9. For this, body 4 presents a horizontal flange 10 and covering 8 has an appropriately directed flangelike portion 11. Portion 11 is provided at least over a partial extent A of separation line 9 between the body 4 and bumper 7 with a strip 12 which is rigid in its configuration. Strip 12 is made of aluminum, steel or some other material with a high E modulus, and it penetrates with a widened portion 13 into flangelike portion 11, so that there is an anchoring effect. Portion 11 may also engage strip 12 with a widening 14, in a recess 15 of said strip 12. Moreover, strip 12 has sleeves 16 in the region of fastening members 15 which are boltable and bear on flange 10. The sleeves 16 are joined with strip 12 so as to be integral therewith, and since they extend through the portion 11 to a point therebeyond where they can bear against the body flange 10, no compression of the elastic material of strip 12 will occur from tightening of the bolts, thereby preventing unsightly indentations or the like.

In the example, strip 12 is disposed on the side of the flange portion that faces away from flange 10 of body 4, and is angular in cross section. However, this construction and form may differ, without deviations from the basic concept of the invention.

It is also noted that strip 12 can be made either as a part that is separate from covering 8, or as a part that is permanently joined therewith such as by bonding or embeding.

While we have shown and described one embodiment in accordance with the present invention, it is understood that the same is not limited thereto but is susceptible of numerous changes or modifications as known to those skilled in the art and we therefore do not wish to be limited to the details shown and described herein but intend to cover all such changes and modifications as are encompassed by the scope of the appended claims.

We claim:

1. In an automobile bumper of the type having a support of a rigid configuration and a covering of elastic material with a flangelike portion securable to a car body by fastening members, the improvement comprising:
a strip formed in a rigid configuration and provided over at least a partial extent of said covering, said strip having sleeves which extend from an outer surface of said covering through said flange-like portion so as to bear on the car body in the region of the fastening members.

2. A bumper according to claim 1, wherein said sleeves are formed unitarily with said strip.

3. A bumper according to claim 1, wherein said strip is further provided with at least a widened part which penetrates into said flangelike portion.

4. A bumper according to claim 1, characterized in that the strip has an angular cross section.

5. A bumper according to calims 1, characterized in that the strip is made of aluminum.

6. A bumper according to claim 1, characterized in that the strip is made of steel.

7. A bumper according to claims 1 or 4 or 2, characterized in that the strip is made as a part which is separate from the covering.

8. A bumper according to claims 1 or 4 or 2, characterized in that the strip is undetachably joined with the covering.

* * * * *